Nov. 22, 1966 H. H. RAWSON 3,287,070
SELF-ALIGNING, WEAR ADJUSTABLE, BURNER BEARING
Filed June 8, 1964 3 Sheets-Sheet 2
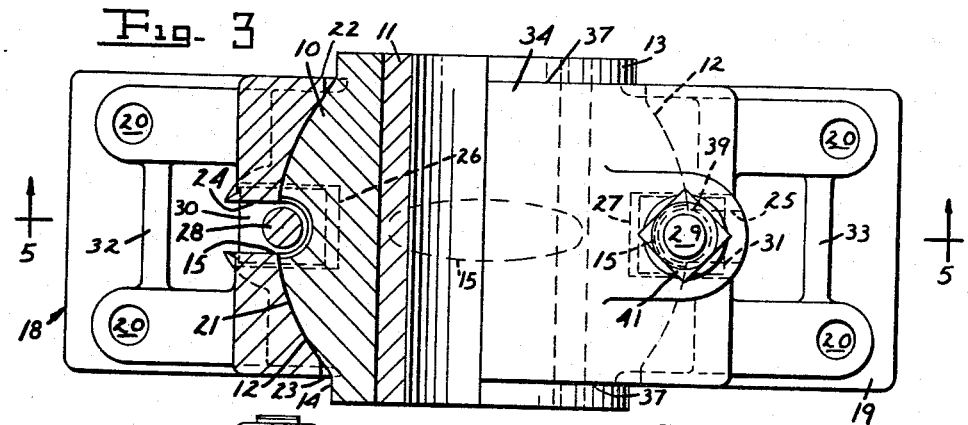
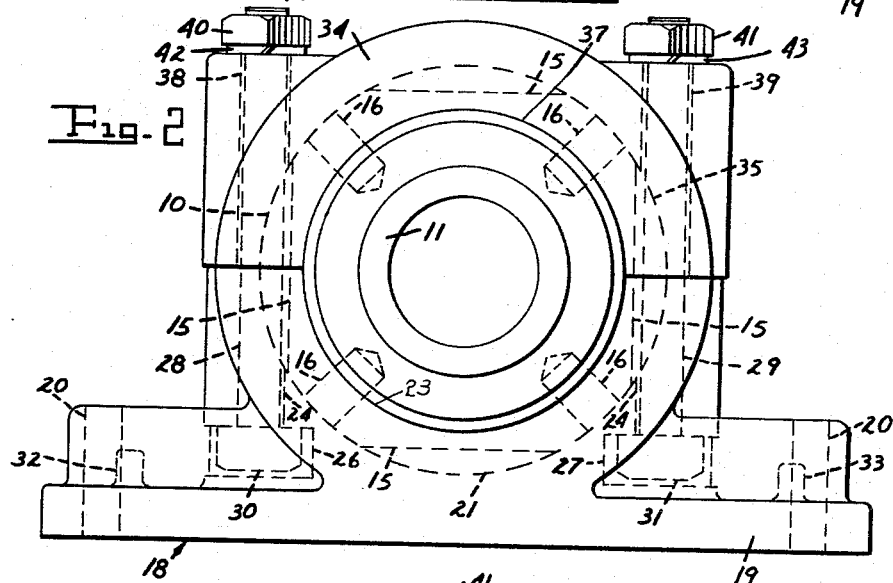
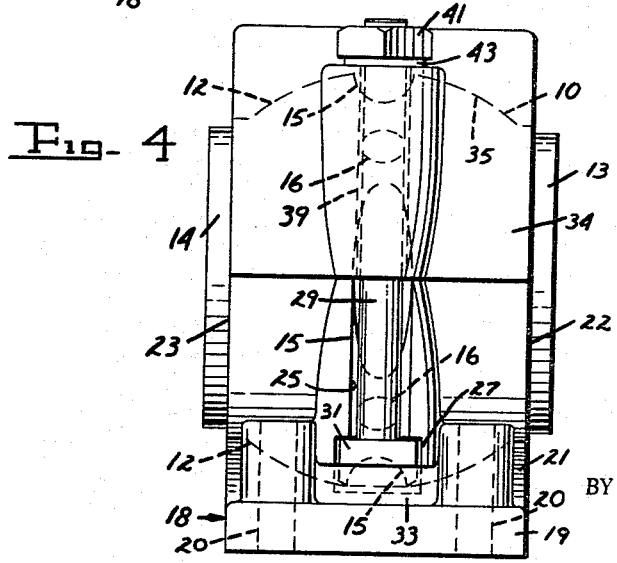
INVENTOR.
HARRY H. RAWSON
BY
Wells & St. John
ATTYS.

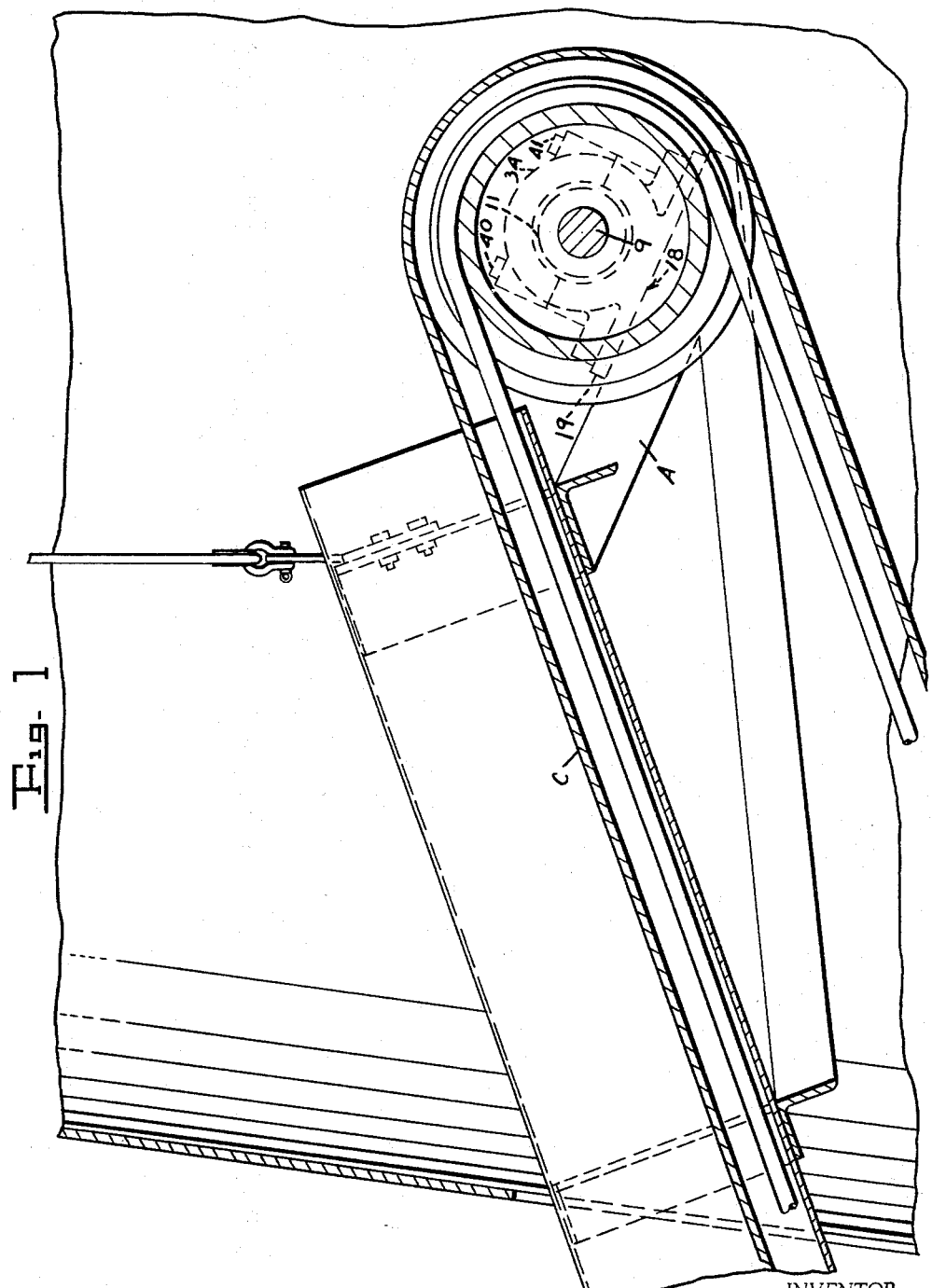

INVENTOR.
HARRY H. RAWSON

3,287,070
SELF-ALIGNING WEAR ADJUSTABLE, BURNER BEARING
Harry H. Rawson, % Washington Machinery & Supply Co., W. 9 Cataldo, Spokane, Wash.
Filed June 8, 1964, Ser. No. 373,347
5 Claims. (Cl. 308—58)

This bearing is intended for use in waste burners at sawmills and the like where they burn sawdust bark and edgings as a means of disposing of them but it is not limited to that use. It is applicable on any shaft where the pressure transversely of the shaft axis is such as to wear the bearing bushing to an egg shape and where adjustment of the bearing to present a new surface for the excessive wear is an economy step compared to replacing the worn bushing.

For example, in these waste burners, a $2^{15}/_{16}$ inch shaft opening is used in the bushing. Because of the heat and difficulty of lubrication a bearing bushing of a high heat resistance and low friction is used. The bushings sold under the trade name "Graphalloy" are examples. They are costly and if they have to be replaced the resultant shut-down time is costly too.

This invention embodies a self-aligning bearing sleeve that carries the bushing with a support for the sleeve which clamps the sleeve in place, yet by simple release of two bolts enables one to insert a lever in the sleeve and turn it a quarter turn at a time to bring a fresh surface of the bushing in position to receive the transverse thrust on the shaft.

The invention is illustrated in the attached drawings wherein:

FIGURE 1 is a somewhat diagrammatic view illustrating a portion of a waste burner where these bearings find use;

FIGURE 2 is a side view of the bearing;

FIGURE 3 is a plan view partly in section of the bearing;

FIGURE 4 is an end view of the bearing;

Figure 5:
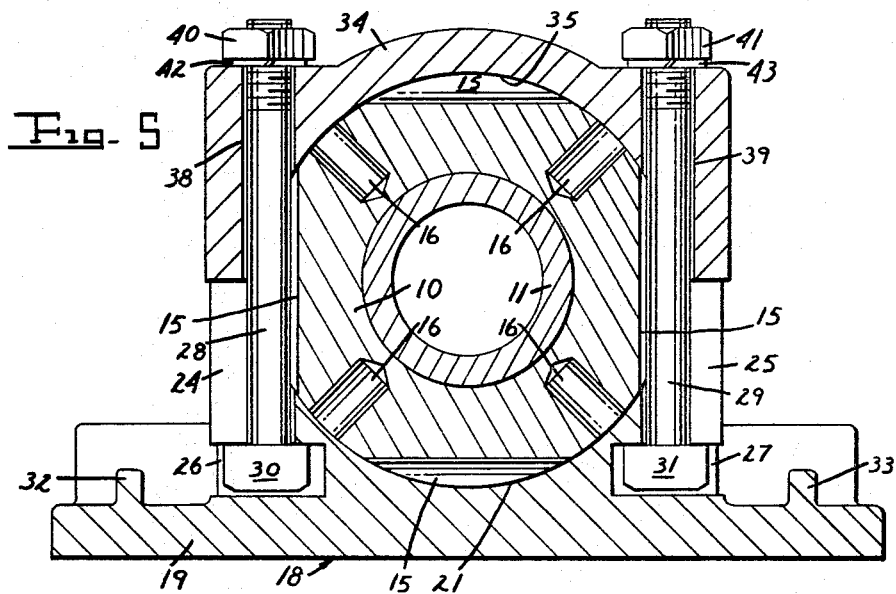
FIGURE 5 is a sectional view taken on the line 5—5 of FIGURE 3.
Figure 6:
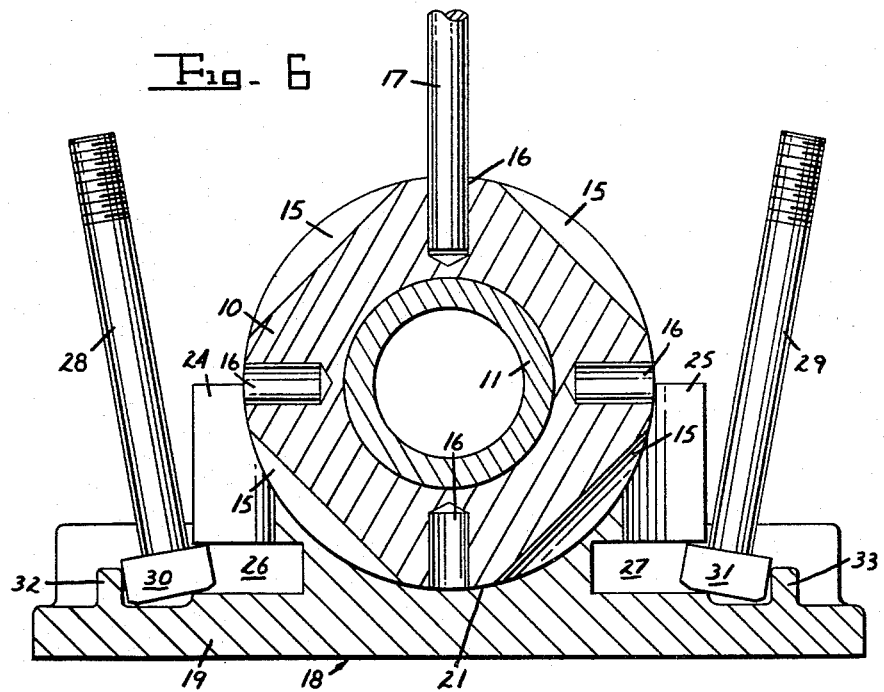
FIGURE 6 is a sectional view on the same line as FIGURE 5, but showing the cap removed and the bearing being adjusted.

The bearing is characterized by a bearing sleeve 10 that receives the bushing 11 as a press fit or has the bushing 11 secured therein in other known ways. The bushing receives shaft 9. The sleeve 10 has a spherical surface 12 with reduced cylindrical end portions 13 and 14 projecting therefrom. The spherical surface 12 is cut away in four places at 15, spaced 90 degrees apart, located midway between the portions 13 and 14 and aligned perpendicular to the axis of the sleeve 10. The bottom level of each cut away portion 15 is at right angles to the bottom lines of the two adjacent portions 15. The surface 12 is also broken by four holes 16 that are drilled in the sleeve 10. As shown, these holes 16 are between the ends of the portions 15 although they need not be, and more holes may be provided. These holes are for the purpose of receiving a hand lever 17.

The bearing sleeve 10 is seated in a bearing block 18 having a rectangular flat bottomed base 19 provided with apertures 20 adjacent the corners for mounting the block on the frame A of a waste burner. The block 18 is formed with an interior seat surface 21 to conform to the surface 12. The edges 22 and 23 of the surface 21 terminate short of engagement with the cylindrical portions 13 and 14. Exteriorly the block 18 has two opposed channels 24 and 25 therein extending parallel to each other. The channels 24 and 25 are enlarged at their lower ends to provide recesses 26 and 27 which receive the heads 30 and 31 of bolts 28 and 29 respectively.

At a distance outwardly from the recesses 26 and 27, the base 19 has upstanding ribs 32 and 33. These ribs extend up to about half the height of the recesses 26 and 27 and are spaced from the open ends of the recesses a distance somewhat less than the distance across the bolt heads 30 and 31. They thus prevent the bolts from sliding or tipping outwardly beyond the channels 24 and 25. However, the spacing of the ribs from the channels 24 and 25 and from the recesses 26 and 27 is sufficient that the bolt heads 30 and 31 can be inserted into the recesses 26 and 27 by first inclining the bolts 28 and 29 into their respective channels 24 and 25 at the tops of the channels and then swinging the heads 30 and 31 inward over the ribs 32 and 33 into the recesses.

The sleeve 10 is held on the block 18 by a cap 34 which has a lower spherical surface 35 that fits the surface 12. The cap is cut away at its edges 36 and 37 so that these edges are spaced from the cylindrical portions 13 and 14 enough to permit limited adjustment of the sleeve 10 about the center of the spherical surface 12 for alignment of the bushing with the shaft 9. The cap 34 has apertures 38 and 39 receiving the bolts 28 and 29. The cap is clamped in place by nuts 40 and 41 and lock washers 42 and 43 on the bolts 28 and 29.

When the bushing 11 is worn and needs adjusting the nuts 40 and 41 and the cap 34 are removed. Then the bolts 28 and 29 are moved outward in their channels 24 and 25 beyond the periphery of the surface 12. Then the hand lever 17 is used to turn the sleeve 10 a quarter turn or more so that the most worn part of the bushing 11 is no longer directly in line with the direction of greatest force on the bearing. I find that this enables me to use the bushings much longer.

The function of the portions 15 is primarily to assure definite positioning of the sleeve 10 upon each adjustment. They overcome any tendency of the sleeve to work back to its original position. They do allow play of the sleeve to permit self aligning of the bearing with respect to the shaft.

One environment in which this bearing is particularly useful is illustrated diagrammatically in FIGURE 1. Here a conveyor C carries waste into a cone shaped enclosure that is used as a burner for the waste. The shaft 9 carries the conveyor C. It will be appreciated that the shaft 9 and its bearings are subjected to heat continually as the waste is burned. The conveyor C has an opportunity to cool while outside the burner. My improved bearing mounts the sleeve 10 so it can be turned while the load of the conveyor C is on the shaft 9. It also mounts the bolts 28 and 29 so they can swing out from the sleeve 10 while it is being turned and be kept from falling into the burner when the cap 34 is lifted off.

It is believed that the nature and advantage of my invention will be clear from the foregoing description.

I claim:

1. A bearing construction for adjustably supporting a cylindrical bushing which rotatably receives a shaft comprising:

a sleeve encircling the bushing and in which said bushing is removably fixed;

a bearing block on which said sleeve is carried, the block having an interior bearing surface on which the sleeve is rotatable about the axis of said bushing;

a cap for said block having an interior bearing surface adapted to engage the outer surface of said sleeve and retain the sleeve on the block;

two bolts carried by the block and extending through apertures in the cap and operable to draw the cap toward the block to retain the sleeve therebetween, the bolts being held substantially parallel by the cap and spaced apart when so held a distance less than the diameter of the sleeve in a plane including the bolts;

the block having at least one channel for receiving one of said bolts which channel opens toward the sleeve;

the sleeve having circumferentially spaced cut away portions in the plane of the bolts, said portions extending straight across the sleeve, whereby to receive the bolt in said channel and thereby restrain rotation of the sleeve while the bolt is in place; and said sleeve having holes in its surface by which it may be turned on the block, when the cap is removed, to bring a different part of the bushing beneath the shaft.

2. The bearing construction defined in claim 1 wherein the block has means at the lower end of said channel mounting the bolt therein for rocking movement in the channel away from the sleeve.

3. The bearing construction defined in claim 1 wherein the bearing surfaces of the block and the cap which engage the sleeve are spherical and the sleeve has an exterior spherical surface conforming to block and cap bearing surfaces.

4. The bearing construction defined in claim 1 wherein the block has a channel for each bolt, and the cut away portions of the sleeve are arranged in diametrically opposed pairs.

5. A bearing construction for adjustably supporting a cylindrical bushing which rotatably receives a shaft comprising:

a sleeve encircling said bushing and in which said bushing is removably fixed, said sleeve having a portion of its outer surface spherical in shape about a point on the axis of the bushing;

a bearing block having a mounting base by which the block may be secured upon a support such as a framework;

said block having an interior sleeve seating surface conforming to the spherical surface of the sleeve on which the spherical surface is movable;

said block having two exterior parallel channels extending upwardly from the mounting base which channels intersect said interior sleeve seating surface for a short distance down from the top of the block, the lower ends of the channels being enlarged;

a bolt in each channel having its head in the enlarged lower end of the channel;

means on the base engageable with the bolt heads to restrain the bolts from falling out of the channels;

a cap for said block apertured to receive said bolts and having an interior spherical surface conforming to the spherical surface of the sleeve;

said sleeve having a plurality of radial sockets in the spherical surface perpendicular to the axis of said bushing; and said sleeve including four circumferentially disposed straight slots located ninety degrees apart to receive the bolts seated in said channels.

References Cited by the Examiner

UNITED STATES PATENTS

| | | | |
|---|---|---|---|
| 1,677,514 | 7/1928 | Derr | 308—62 X |
| 2,710,235 | 6/1955 | Olsen | 308—63 |

FOREIGN PATENTS 500,440  12/1919  France.

DAVID J. WILLIAMOWSKY, *Primary Examiner.*

R. F. HESS, *Assistant Examiner.*